United States Patent [19]
Inbar et al.

[11] Patent Number: 6,101,749
[45] Date of Patent: *Aug. 15, 2000

[54] TRANSPARENCY VIEWING APPARATUS

[75] Inventors: Dan Inbar; Giora J. Teltsch, both of Haifa, Israel

[73] Assignee: Smartlight Ltd., Yokneam Elit, Israel

[*] Notice: This patent is subject to a terminal disclaimer.

[21] Appl. No.: 08/463,107

[22] Filed: Jun. 5, 1995

Related U.S. Application Data

[62] Division of application No. 07/862,982, Apr. 6, 1992.

[51] Int. Cl.$^7$ ..................................................... G02B 27/02
[52] U.S. Cl. .................................. 40/361; 40/448; 345/90
[58] Field of Search ............................. 40/361, 448, 362, 40/366, 367; 345/87, 90, 102, 103

[56] References Cited

U.S. PATENT DOCUMENTS

| | | |
|---|---|---|
| 1,988,654 | 1/1935 | Haag . |
| 2,436,162 | 2/1948 | Cadenas . |
| 3,714,413 | 1/1973 | Craig . |
| 4,004,360 | 1/1977 | Hammond . |
| 4,373,280 | 2/1983 | Armfield, III . |
| 4,510,708 | 4/1985 | Pokrinchak . |
| 4,637,150 | 1/1987 | Geluk . |
| 4,874,227 | 10/1989 | Matsukawa et al. ...................... 359/42 |
| 4,977,315 | 12/1990 | Purcell . |
| 5,313,726 | 5/1994 | Yaniv . |
| 5,367,390 | 11/1994 | Scheffer et al. ........................... 359/67 |
| 5,430,964 | 7/1995 | Inbar et al. . |
| 5,491,332 | 2/1996 | Inbar et al. . |

FOREIGN PATENT DOCUMENTS

| | | |
|---|---|---|
| 165 548 | 12/1985 | European Pat. Off. . |
| 436 267 | 7/1991 | European Pat. Off. . |
| 1 961 126 | 7/1970 | Germany . |
| 33 31 762 | 3/1985 | Germany . |
| 90 10 889 | 10/1991 | Germany . |
| 91/10152 | 7/1991 | WIPO . |

OTHER PUBLICATIONS

Global and Segmented Search for Lung Nodules of Different Edge Gradients (Dennis P. Carmody et al., Investigative Radiology, May–Jun. 1980, vol. 15, No. 3).

*Primary Examiner*—Brian K. Green
*Attorney, Agent, or Firm*—Darby & Darby

[57] ABSTRACT

Viewing apparatus including a viewing surface having a viewing area, back-lighting apparatus for selectably adjusting the back-illumination of areas of the viewing surface, the areas having a given extent, the back-lighting apparatus including: a liquid crystal array of individually controllable liquid crystal light attenuators located behind the viewing surface, each element of the array being associated with an area of the viewing surface and including active elements having a controllable opacity over an area smaller than the given extent of the area with which it is associated, and inactive areas between the active elements, a light source behind the array of light attenuators and a plurality of light guides, each associated with an element of the array and located between the element and its associated area on the viewing surface for providing controlled illumination of the associated area including at least a portion of the space surrounding the active element.

3 Claims, 9 Drawing Sheets

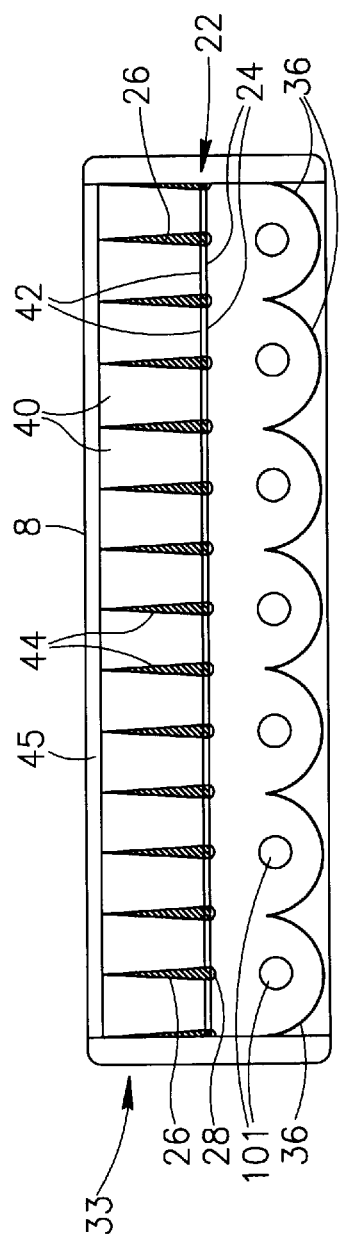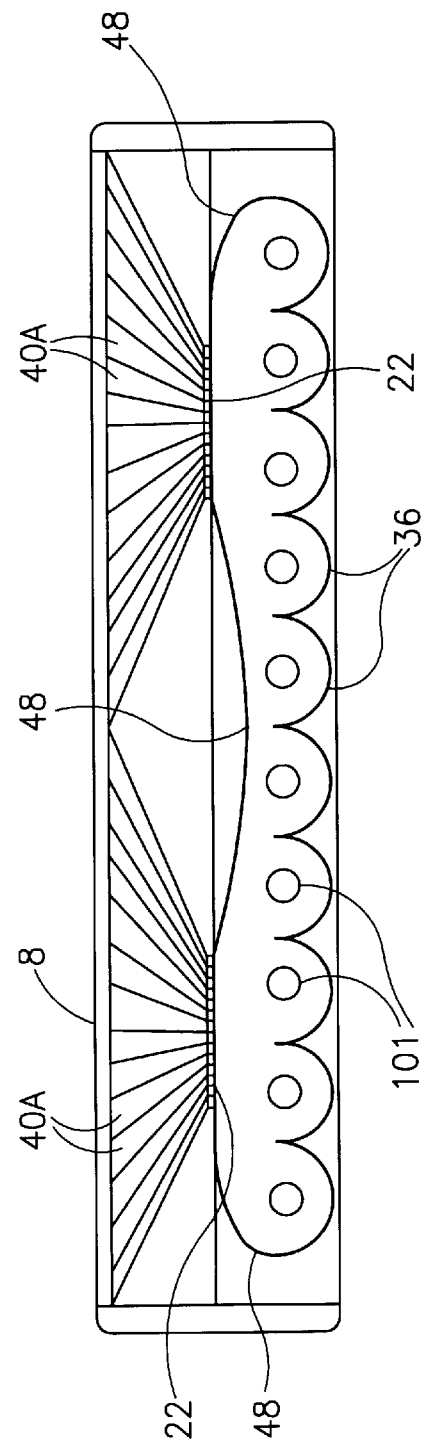

ered to as an illuminator. Conventional illumina-
TRANSPARENCY VIEWING APPARATUS This is a division of application Ser. No. 07/862,982, filed Apr. 6, 1992, which is pending.

FIELD OF THE INVENTION

The present invention relates generally to a transparencies viewing device, more particularly, to apparatus for holding and illuminating X-ray and like transparencies.

BACKGROUND OF THE INVENTION

Medical X-ray transparencies usually are examined by placing them over the viewing surface of a device commonly referred to as an illuminator. Conventional illuminators normally comprise a box-like structure enclosing fluorescent lighting tubes behind a light diffusing plate defining the display area. Commonly, transparencies are retained on the surface of the viewing surface by pushing the upper edge of the transparencies under spring-loaded film-holder clips located along the top edge of the viewing surface.

Standard size illuminators have a viewing surface 17 inches high and 14 inches or multiples of 14 inches (i.e. 28 inches or 56 inches) wide. Usually, each 14 inch width of viewing surface has its own fluorescent tubes and control switch. Such viewing surface enable viewing standard size X-ray films which measure up to 17 inches by 14 inches.

The sections of the viewing surface not covered by transparencies need not be illuminated. This eliminates unnecessary glare from areas outside the transparency. When transparencies smaller than 14 inches by 17 inches are to be examined, they are typically retained on the display area in the same manner as full size transparencies, i.e., suspending them by means of the film-holders along the top of the viewer. This leaves a portion of the display area surrounding the transparencies fully illuminated with the resulting glare detracting from the visual perception of the person trying to study the transparency and assess the information it contains.

Often, transparencies contain several very transparent areas, and frequently, radiologists have to examine overexposed transparencies. In these cases, considerable glare emanates through areas of the transparencies themselves.

Attempts have been made in the past to provide viewing devices for X-ray transparencies which shield the eyes of the observer from light emanating from light sources other than the light passing through the transparencies, to obscure light in parts of the transparencies, and to reduce the contrast in transparencies when so required.

In U.S. Pat. No. 1,988,654 to Haag, there is disclosed a light box which incorporates two manually movable curtains for masking all of the light transmitting surfaces of a diffuser up to the edges of a transparency.

U.S. Pat. No. 2,436,162 to Cadenas discloses an X-ray viewer having a masking arrangement incorporating a plurality of hingedly connected opaque masks which may be manually pivoted relative to each other to expose all or only selected parts of an X-ray transparency.

U.S. Pat. No. 4,004,360 to Hammond is directed to a self-masking viewing device which purports to automatically obscure areas of the viewing screen not occupied by the X-ray transparency. In accordance with such device, the screen is provided with a multiplicity of holes which may be selectively blocked by shutters or opened for the passage of light. The interior of the device is connected to a vacuum source which functions to hold the film against the front surface of the device.

The vacuum functions, in addition, to close the shutters connected with those of the holes not covered by the transparencies, so that passage of light through such holes is prevented. Air cannot pass through those of the holes in registry with the transparencies and, thus, the shutters associated with the covered holes remain open for the passage of light. The device described is unsuitable for critical X-ray transparencies inspection since the presence of holes and shutters in the viewing screen in the areas in registry with the transparencies creates a pattern behind the transparencies which interferes with the ability to accurately read them.

U.S. Pat. No. 4,373,280 to Armfield discloses an X-ray viewing plate having a cross bar for supporting transparencies at a central portion of the screen. A series of shades is provided which may be manually activated to obscure selected parts of the illuminated surface.

U.S. Pat. No. 4,510,708 to Porkinchak discloses an X-ray viewing device which includes a series of masks on an elongated scroll. In a specific embodiment, the scroll is moved by a motor on a pair of feed rolls. The masks are sized to correspond with stock sizes of X-ray transparencies. The apparatus has a dimensional sensing mechanism which aligns a selected mask with a positioned transparency automatically in accordance with the sensed dimension. The transparencies are inserted into a film-holder. The widthwise sensing function is performed by a series of levers or fingers positioned to engage an edge of the film.

U.S. Pat. No. 4,637,150 to Geluk describes a system in which a cathode ray tube is used as a light source and the light emitted by this source is modulated in accordance with the stored density of a transparency. This system is impractical due to the limited sizes and associated light intensity outputs of CRTs for this type of illuminator.

German Patent Application DE 33 31 762 A1 describes an array type electrochromatic illuminator in which backlighting selectively illuminates portions of a viewing surface in response to the application of voltage to horizontal and vertical strip conductors on opposite faces of an electrochromatic material placed between the source of illumination and the viewing surface.

Flat panel displays such as liquid crystal displays (LCD) are well known. Such displays are used extensively for visual display in applications such as car dashboards, instrumentation panels, household devices, sign-posts, etc. Liquid crystal arrays (LCA) are used for displays such as computer display monitors, TV monitors and projection devices. In WO 91/10152 the present inventors proposed such a device for use in an improved transparency viewing apparatus.

SUMMARY OF THE INVENTION

In general, liquid crystal display arrays require spaces between the active elements for passing conductive addressing elements therebetween (especially for direct addressing liquid crystal arrays in which separate conductors feed each element in the array) and to avoid voltage breakdown between the elements. Thus back-lighted viewers having controllable arrays do not provide a completely uniform illumination of the surface. The use of diffusing elements only partially solves the problem since such elements also diffuse light across the boundaries of areas associated with the individual elements and do not completely overcome the non-uniformity of illumination caused by the limited coverage of the active areas of the elements.

For practical view boxes, the viewing area are generally large enough to view a 14"×17" (35.6 mm×43.2 mm) film with some allowance for variation in placement of the film.

LCD displays, including direct addressed and multiplexed types, however, are generally available only in smaller sizes, with the price per unit area being substantially higher for the larger units. One aspect of the present invention is the provision of a system for utilizing smaller LCDs in a larger total viewing area without having annoying visible "seams."

LCD element are often imperfect, as for example geometric flaws or where part of the element has a different transmission than the rest of the element. Normally, such units would have to be discarded in most applications since the non-uniformity flaw is objectionable. According to one aspect of the present invention such flaws are homogenized into the light provided by the element as a whole, enabling the use of LCD arrays which are of much lower cost. Thus, for example, rejected units from demanding applications can be utilized in the present invention.

In order to overcome this problem, preferred embodiments of the invention include a plurality of optical couplers, for example, light guides, each associated with an element of the LC array and located between the element and its associated area on the viewing surface for providing controlled illumination of the associated area including at least a portion of the space surrounding the active element.

There is therefore provided, in accordance with a preferred embodiment of the invention, viewing apparatus including:

a viewing surface having a viewing area comprising elemental portions of a given extent;

back-lighting means for selectably adjusting the back-illumination of the elemental portions of the viewing surface, the back-lighting means including:

an array of individually controllable light attenuators, preferably of liquid crystal (LC) elements, located behind the viewing surface, each such element of the array being associated with an elemental portion and including active elements having a controllable opacity over an area smaller than the given extent of the elemental portion with which it is associated, and inactive areas between the active elements;

a light source behind the array of light attenuators; and a plurality of light couplers, each associated with an elemental portion and located between the elemental portion and a corresponding element of the array for providing controlled and substantially uniform illumination of the elemental portion of the viewing surface.

The light couplers preferably include flared collimators. In a preferred embodiment of the invention the light couplers include truncated pyramid shaped elements where, preferably, the relatively smaller truncated top of each pyramid is optically coupled to an element of the array and the relatively larger bottom of the pyramid is coupled to the associated elemental portion of the viewing surface. Preferably, at least a portion of the sides of the pyramid are coated with a light-reflecting coating.

Preferably, the bottom portions of the pyramids are arranged in an array covering substantially the entire viewing area.

In a preferred embodiment of the invention the viewing apparatus also includes a diffuser placed between the guiding elements and the viewing area to blur the transition, in light intensity at the boundary between two guiding elements.

The viewing apparatus includes, in a preferred embodiment of the invention, reflecting elements to reflect light from the light sources toward the light attenuators and reflectors placed behind the inactive areas of the array for reflecting light therefrom toward the reflecting elements.

Where the active areas include operative and inoperative sections, the light couplers are preferably operative to diffuse the light passing through the operative sections so as to illuminate portions of the viewing surface associated with the inoperative sections.

In a preferred embodiment of the invention the light couplers include reflector elements therein to reflect a portion of the light incident on a part of the elemental portion.

In a preferred embodiment of the invention, the array of attenuators includes a plurality of liquid crystal array structures which overlay at their borders causing a reduced transfer of light thereat.

Preferably the viewing apparatus includes addressing means for separately addressing each light attenuator, which preferably includes means for supplying a drive to the attenuator, whereby the transmission of the attenuator is functionally related to the drive.

There is further provided in a preferred embodiment of the invention, a light box for viewing objects comprising:

a viewing apparatus for viewing a transparency as described above;

imaging means, operative during an opacity determination mode, for imaging the back of said attenuators when the light source is extinguished, thereby to determine the intensity of light, arising outside the light box, which passes through each of the attenuators wherein said imaging means also supplies electrical signals indicative of the intensity; and control means, operative during a viewing mode, for selectively varying the opacity of the attenuators in response to the electrical signals.

There is further provided in a preferred embodiment of the invention a light box for viewing objects comprising:

a viewing surface for back-lighting a transparency to be viewed;

an array of light attenuators located behind the viewing surface and having individually controllable opacity;

a light source located behind the array for providing illumination to the viewing surface through the attenuators during a viewing mode;

imaging means, operative during an opacity determination mode, for imaging the back of said attenuators when the light source is extinguished, thereby to determine the intensity of light, arising outside the light box, which passes through each of the attenuators wherein said imaging means also supplies electrical signals indicative of the intensity; and control means, operative during the viewing mode, for selectively varying the opacity of the attenuators in response to the electrical signals.

In a preferred embodiment of the invention the imaging means is operative, in the absence of the transparency to be viewed, for determining the variations of opacity between the attenuators and where the control means includes means for individually adjusting the opacity of a plurality of the attenuators thereby to correct for said variations.

Preferably, the imaging means is operative, in the presence of the transparency to be viewed, for determining the boundaries of the transparency, wherein the control means also includes masking means for adjusting the opacity of a plurality of the attenuators to provide a substantially uniform illumination, which can be substantially zero illumination, outside the boundaries of the transparency.

In a preferred embodiment of the invention the imaging means is operative, in the presence of the transparency, to determine the relative optical density of portions thereof and the control means is operative to selectively vary the opacity of at least one attenuator to at least partially compensate for gross variations of opacity of the transparency.

Preferably, the imaging means comprises:
- a light detector, preferably a television camera, for detecting the distribution of light on a detection surface; and
- a beam splitter placed between the array of attenuators and the light source for reflecting light from the back of the array to the surface.

In a preferred embodiment of the invention the relative positions of the individual light attenuators are not the same as those of the relative positions of the elemental portions with which they are associated.

In a preferred embodiment of the invention, the on-off contrast ratio of light passing through the light attenuator varies with the angle of incidence of the illumination thereof. Preferably, the light attenuators are illuminated mainly at a high contrast angle.

Preferably, the light box also includes apparatus for preferentially coupling light which passes through the attenuators at high contrast angles as compared to light passing though the attenuators at other angles.

BRIEF DESCRIPTION OF THE DRAWINGS

For a better understanding of the invention with regard to the preferred embodiments thereof, reference is made to accompanying drawings in which like numerals designate corresponding sections or elements throughout, and in which:

FIG. 5 is a further schematic cross-sectional view of a viewing device according to a preferred embodiment of the present invention;

FIG. 6 is a schematic cross-sectional view of a further preferred embodiment of the present invention utilizing spaced apart LCA panels;

DETAILED DESCRIPTION OF PREFERRED EMBODIMENTS

Figure 1:
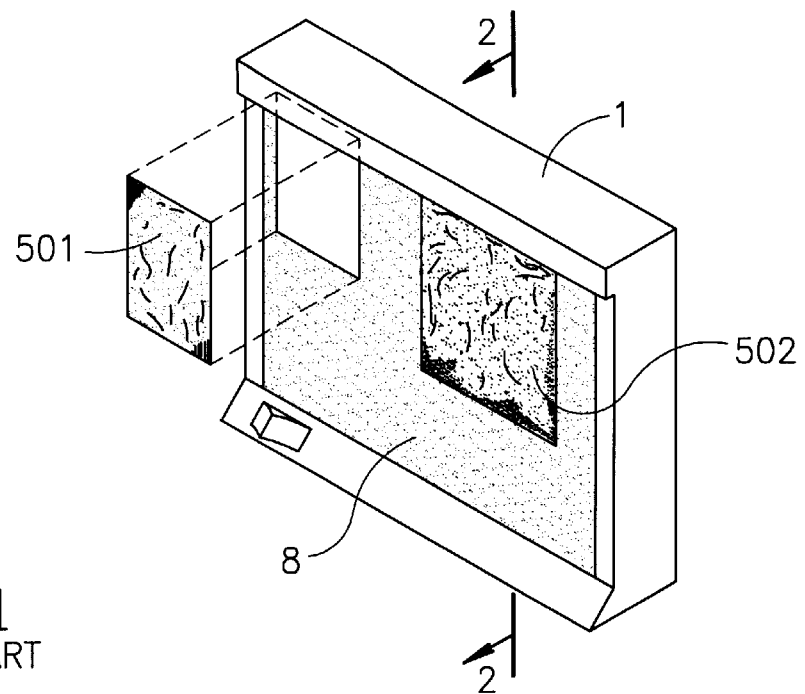
FIG. 1 is a perspective view of a viewing device.
Figure 2:
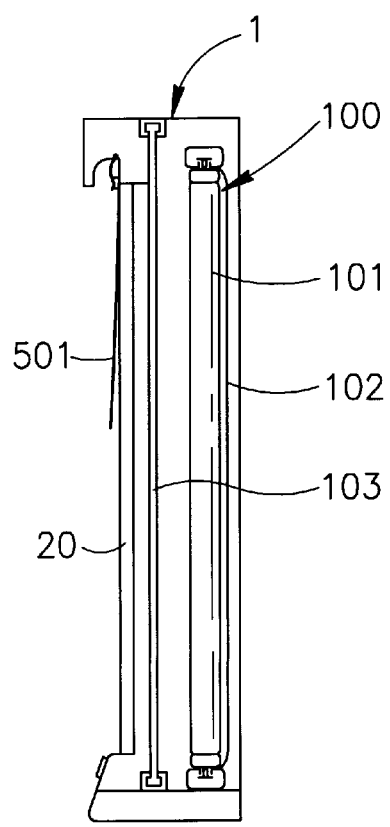
FIG. 2 is a cross-section of a viewing device according to the prior art.

FIGS. 1 and 2 illustrate an illuminator according to the above mentioned PCT publication WO 91/10152, the disclosure of which is incorporated herein by reference.

Referring now to FIG. 1, there is illustrated an embodiment of a viewing device 1 having a viewing surface 8 which can be large enough for simultaneously presenting two X-ray transparencies 501 and 502.

A cross-sectional view of viewing device 1, taken along section lines 2—2 is illustrated in FIG. 2. Device 1 includes a primary illuminator 100 as an illumination means, comprising fluorescent bulbs 101 as a light source, reflectors 102, and a diffuser plate 103.

In the prior art publication viewing device 1 also includes an electro-optical masking device 20, for example a liquid crystal array (LCA) or an electro-chromatic array device as described in the background of the invention.

While ideally the elements of the array should abut so that areas larger than the area of an element of the array can be uniformly illuminated, this is rarely the case.

Figure 3:
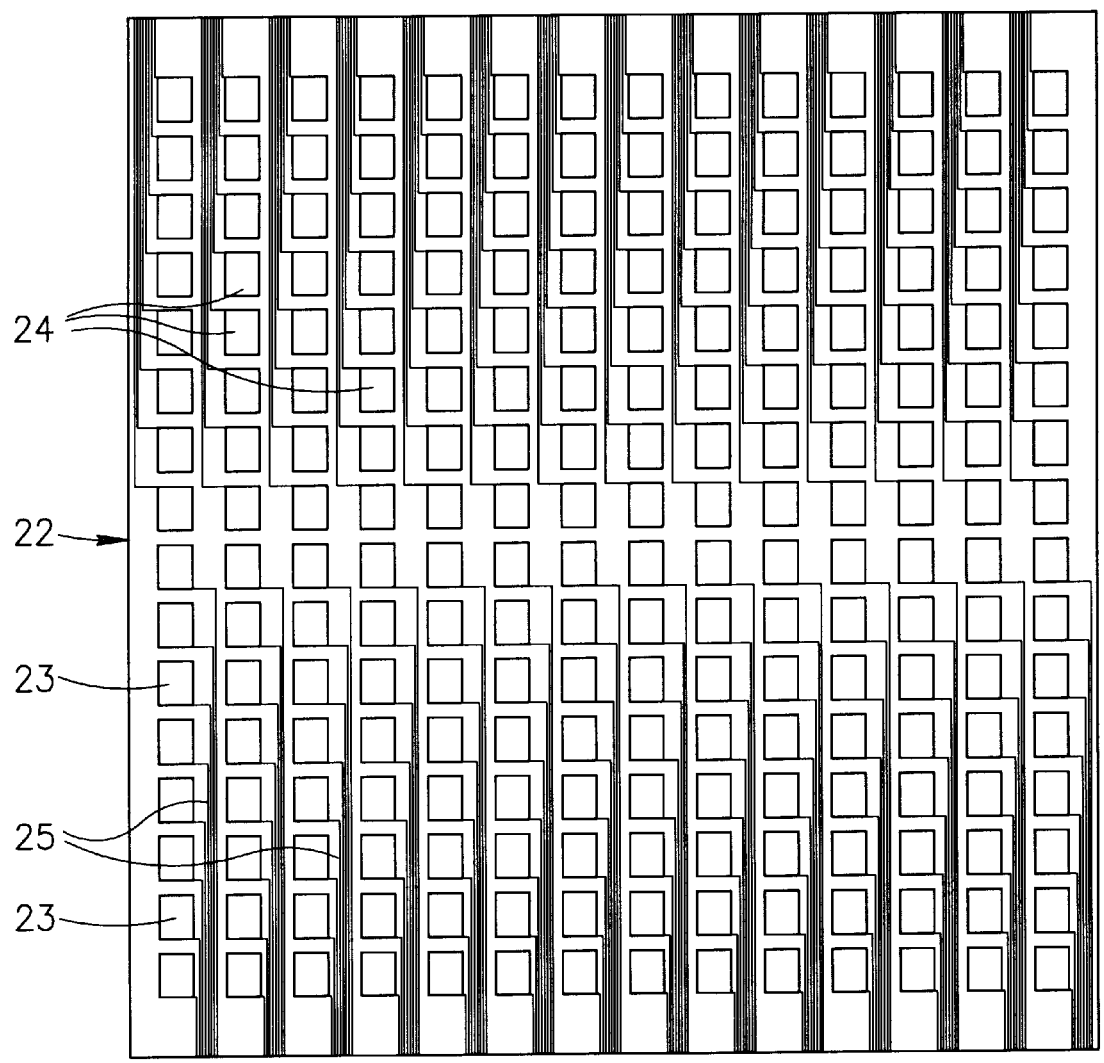
FIG. 3 is a schematic view of the layout of an LCA masking device used in the present invention.

FIG. 3 illustrates a practical LCA 22 for use in a viewing device. The illustrated LCA is preferably a directly addressed array of individual liquid crystal elements 24. Directly addressed arrays are preferred due to their higher contrast when compared to multiplexed passive arrays and lower cost and larger available sizes when compared to active matrix LCAs. In directly addressed arrays, space is provided between elements 24 to allow for the passage of conducting elements 25 for the delivery of switching voltages to elements 24. In general in a directly addressed LCA, conducting elements are generally connected to each element 24. In a practical array, this space can be as high as 30% of the area of the display. For example, in a typical 13"×13" array, divided into a matrix of 14×17 elements, the required spacing between elements is about ¼ wide.

Thus, each of the elements of the display has a controllable opacity over an area smaller than the given extent of the portion of viewing surface 8 with which it is associated and inactive areas between the elements. Clearly, in the prior art systems, the viewing surface would not be completely uniformly illuminated.

Furthermore, the elements themselves may have voids or other non-uniformities which would lead to further non-uniform illumination of the surface.

An object of the above mentioned PCT application and of the present invention is to provide a uniformly lit frame around the transparencies. In one embodiment of the invention, light is completely blocked outside the extent of the transparency, in another the outside area has the illumination preferably uniformly equal to the average amount of light passing through the transparency. Within the borders of the transparency, in one preferred embodiment of the invention, a uniform back-illumination of the transparency is supplied. In another preferred embodiment of the invention, the back-lighting for each element of the transparency is substantially proportional to the average opacity of the transparency over the element.

Figure 4:
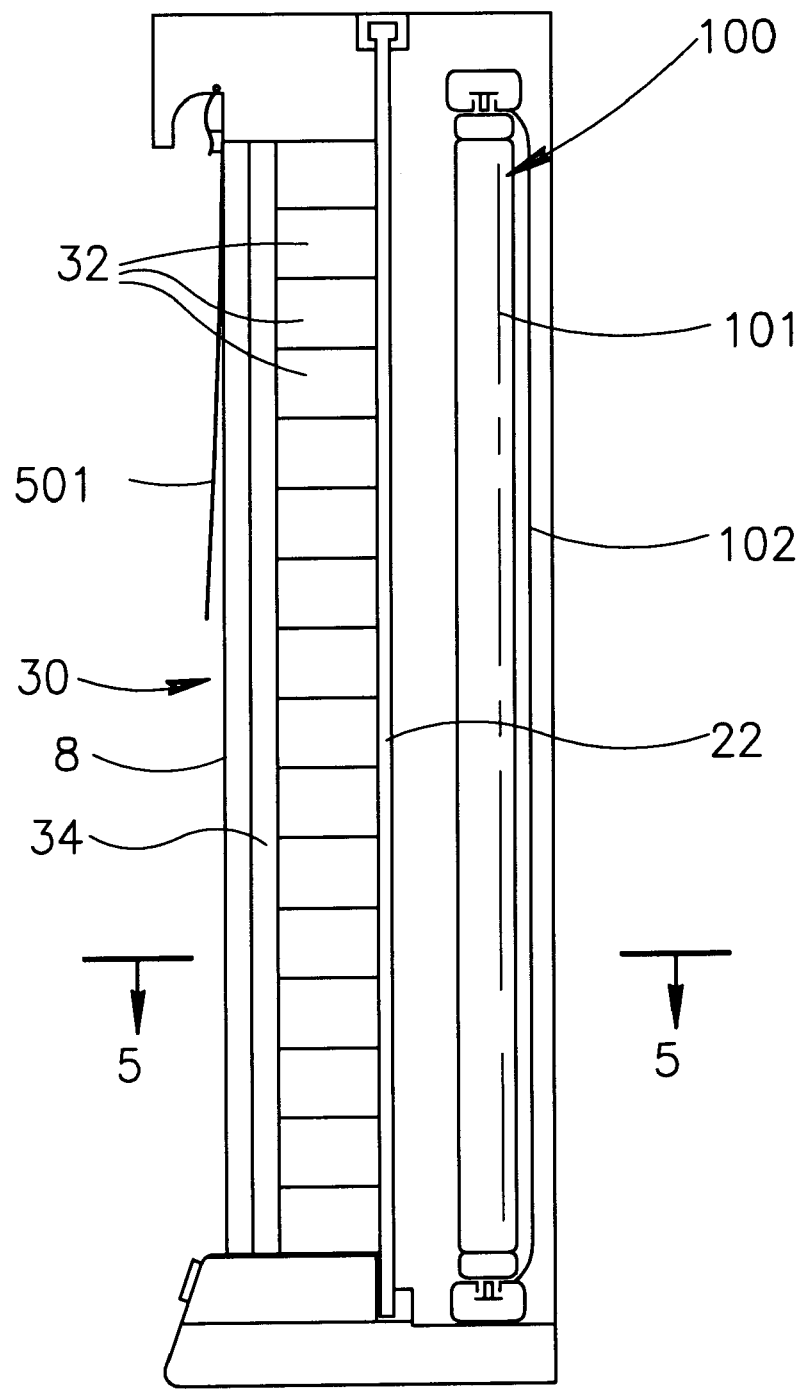
FIG. 4 shows a schematic cross-sectional view of a viewing device according to the present invention.

FIG. 4 shows a viewing device 30 in accordance with a preferred embodiment of the invention. Viewing device 30 includes a plurality of optical couplers, preferably light guiding means 32, preferred embodiments of which are described below, each preferably associated with an element of LC array 22 and located between the element and its associated area on viewing surface 8. Optical couplers 32 provide for controlled illumination of the portion of the viewing surface associated with the element despite the fact that the element is smaller than its associated area on viewing surface 8.

Viewing device 30 may also include a diffuser plate 34 for diffusing the light passing through light guiding means 32 before it reaches viewing area 8.

FIG. 5 is a cross-sectional view of a preferred embodiment of the viewing device of FIG. 4 along lines 5—5 of FIG. 4. This embodiment of the invention preferably includes parabolic reflectors 36 for producing a relatively uniform illumination of the backside of array 22 by reflection of the light produced by fluorescent lights 101. As described above with reference to FIG. 3, the elements. 24 of array 22 are separated- by inactive areas 26. In a preferred embodiment of the invention, reflectors 28 are provided at the rear of the inactive areas for reflecting light from those areas for re-reflection by parabolic reflectors 36, thereby increasing the overall light utilization efficiency and contrast of the device.

In the embodiment of FIG. 5, the elemental optical couplers are truncated pyramidical elements 40 which together comprise a light guiding array 33. Each of elements 40 has a smaller face 42 (formed by the truncated top of the pyramid) optically coupled to the respective element 24 of array 22 and a relatively larger bottom face of the pyramid coupled to the associated area of viewing surface 8. In a preferred embodiment of the invention, elements 40 are formed of a plastic material having a refractive index intermediate the refractive index of the LCA elements and the guiding means to improve light transmission. Other refractive index matching techniques as known in the art can be used as well.

Side surfaces 44 of elements 40 are preferably coated with a diffuse reflector material such as Aluminum Oxide or a reflecting mirror-like surface. Light which passes through an "open" element of array 22 is reflected within the truncated cone 40 to form a relatively uniform illumination of the portion of viewing surface 8 associated with the element. Furthermore, if a portion of element 24 is flawed, then light guiding means 40 will diffuse the light so that this flaw is not projected onto the viewing surface. A diffuser 45 is preferably added to further smooth the light at the viewing surface. In effect, the light passing through each of elements 24 is homogenized so as to provide a more uniform surface illumination. Specific preferred structures of light guiding means 40 for improving the homogenization of the light are given below. Such structure is generally applicable to all of the preferred embodiments of the invention.

Figure 7:
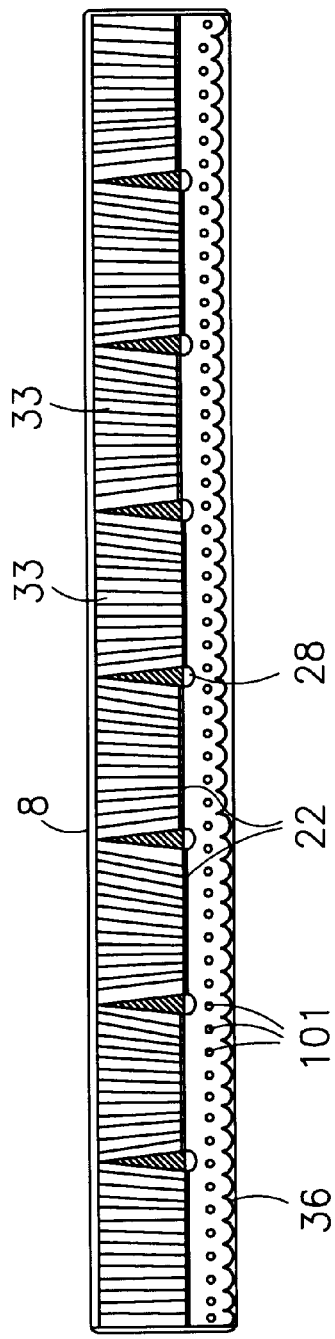
FIG. 7 is a schematic cross-sectional view of a further preferred embodiment of the present invention using overlapping LCA panels.

FIGS. 6 and 7 show alternative preferred embodiments of the invention which utilize a plurality of commercially available LCA panels 22 to cover a larger surface than the area of an individual array. In general LCAs are available limited sizes such as, for example, 13"×13". Since viewing surfaces, even for a single film display, are larger than this area, a plurality of LCA panels must be used. The active arrays in the panels are surrounded by relatively large dead spaces so that the active areas of adjacent LCA panels can not be abutted. In a preferred embodiment of the invention a series of flared collimator light guides 40A provided as the optical couplers. These collimators are similar in construction to those of FIG. 5, except that, since the element associated with an area of the viewing surface is not directly behind the associated area, the pyramids are not right pyramids but rather are skewed as shown.

In the preferred embodiment shown in FIG. 6 LCA panels 22 are spaced apart and reflectors 48 are provided to reflect back the light which reaches the space between and beyond the LCA arrays.

In general, the LCA elements associated with each area of the viewing surface are between about 0.4" and 1" square.

In an alternate preferred embodiment of the invention as shown in FIG. 7, a series of LCA panels 22 are overlapped to provide a continuous array of LC elements. Since the edges (ledges) of the LCA panels do not transmit light, each array of light guides 33 is flared somewhat so that the entire viewing surface is illuminated. This construction is especially useful for providing a viewing surface which is very large, such as an entire illuminated wall.

The systems as described above utilize a plurality of LC elements. One of the advantages of the system of light guiding means is that it allows for using flawed LCAs in which some of the elements or portions of an element are somewhat less transmissive than others. Such flaw is illustrated in FIG. 3 at reference 23. In order to secure this benefit and to compensate for other sources of varying transmissivity, such as variability in the transmission of the optical coupling means, it is necessary, in a preferred embodiment of the invention, to map the transmissivity of the array and to compensate for variations by selectively adjusting the transmission of the elements.

Figure 8:
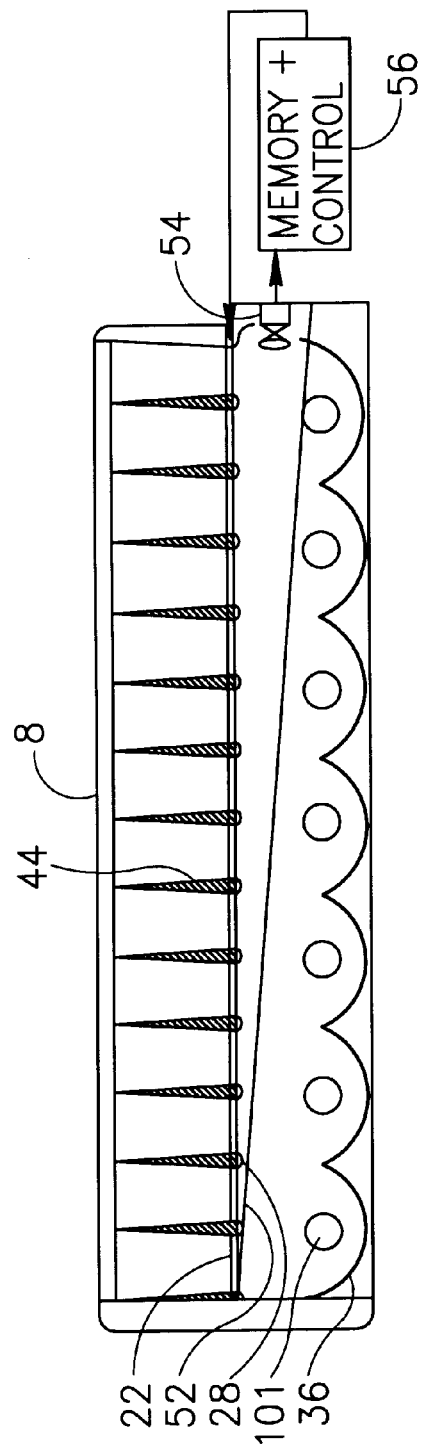
FIG. 8 is a schematic cross-sectional view of a further preferred embodiment of the present invention.

FIG. 8 shows a preferred embodiment of the invention in which a beam splitter 52, for example, a semi-transparent mirror, is provided at an angle between primary illuminator 100 and the back of LCA 22. In a mapping mode of operation, primary illumination is shut off and room lighting is turned on to illuminate viewing surface 8. All of the LCA elements are switched on (i.e., made fully transparent). Light, which is transmitted through the light guiding means and the elements of the LCA, is reflected by beam splitter 52 to a light detector 54 for detecting the distribution of light on its input surface. One suitable detector is a TV or CCD camera. The output of the camera is a video signal representing the position-dependent transmissivity of the system. In a preferred mode of operation, the attenuation of the elements of array 22 are selectively adjusted by memory and control apparatus 56 which selectively varies the voltages supplied to the elements to provide uniform illumination on an array element basis as seen by the camera. The values of voltage are stored in apparatus 56 and constitute the baseline for providing black or gray masks for the transparencies, and for providing uniform or controlled non-uniform illumination to the back of the transparency.

In a second mode of operation, illuminator 101 is turned off after the transparency is mounted on surface 8 and the light transmission, including the transparency, is mapped. In this preferred mode of operation, memory and control apparatus 56 selectively adjusts the attenuation of the elements of array 22 (by varying the voltages supplied thereto) to provide uniform illumination on an array element basis as seen by the camera. Alternatively, in a preferred mode of operation, elements having higher than a given level of illumination (i.e. those outside the bounds of the transparency) are turned off. With the voltages maintained at these values, illuminators 101 are turned on and the transparency is viewed with either a black mask or with a mask having the same illumination as the average amount of light passing through the transparency, as desired. The transparency is either uniformly back-lighted or is non-uniformly illuminated as described above and in the above-referenced PCT application.

Figure 9A:
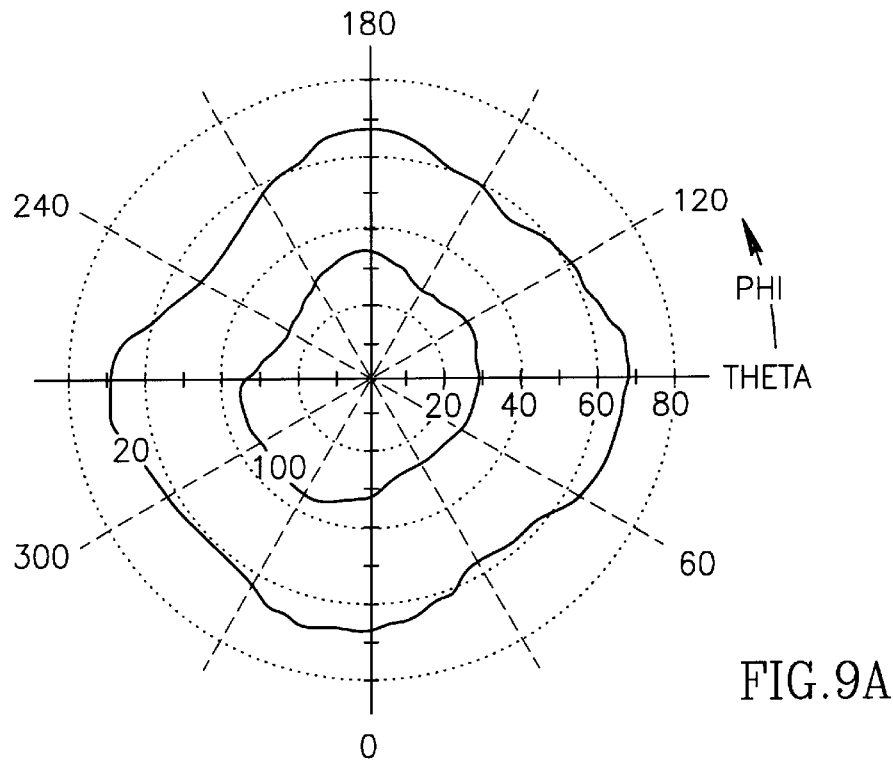
FIGS. 9A and 9B are isocontrast transmission plots of LC elements.
Figure 9B:
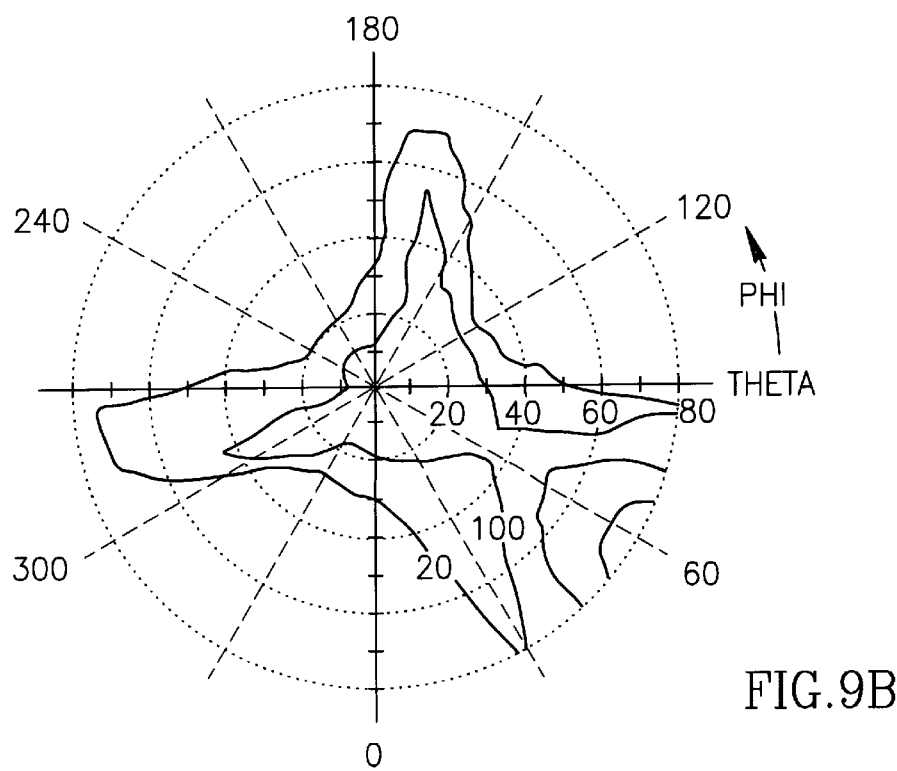

In an LC device as described above, it is important that the difference in light passing through the LC elements in their on and off states be a maximum. In general, therefore, either directly addressed LC arrays or active matrix arrays are preferred. This "contrast" value is non-isotropic, i.e., it is a strong function of the angle at which the light passes through the LC element. In some LCs the contrast is a maximum for head-on viewing while, for others, the maximum contrast is skewed to one side. FIG. 9A shows a typical isocontrast transmission plot for an LC of the first type, while FIG. 9B shows the plot for an LC having an off-normal preferred direction of transmission. In both plots, the distance from the center represents the angle of view from the normal to the element (Theta), while the angle Phi is the direction of view. The isocontrast lines represent constant contrast ratios with the values indicated. In a preferred embodiment of the invention, the angle of the light from the illuminators is adjusted so that the light enters the LC elements at a "high contrast angle." Alternatively or additionally, light which passes through the LC element at low contrast is selectively absorbed.

Figure 10:
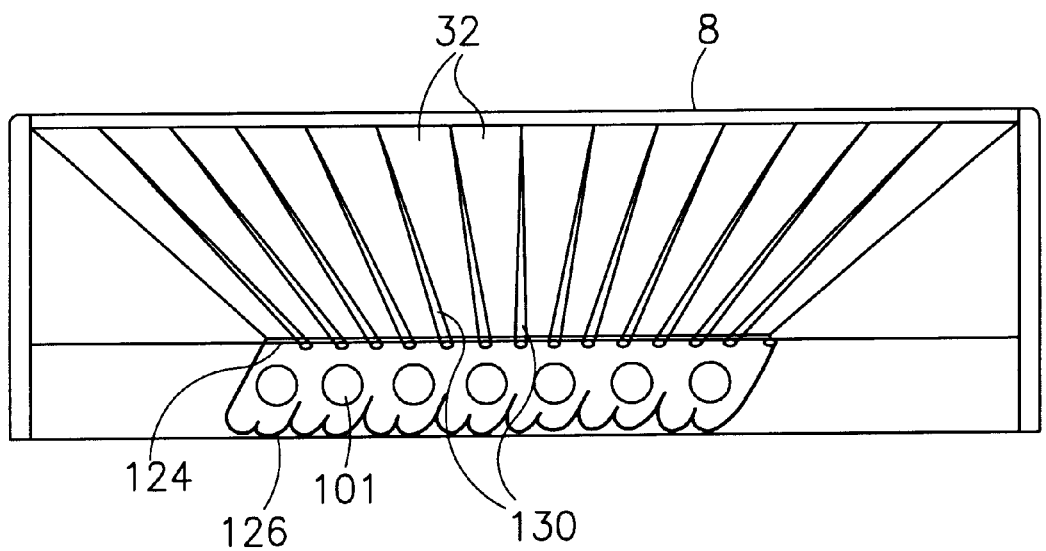
FIG. 10 is a schematic cross-sectional view of a light box utilizing LC elements having the isocontrast transmission plot of FIG. 9A.

FIG. 10 shows a light box having such a structure. LC elements 124 have a transmission curve such as that shown in FIG. 9B and reflectors 126 are positioned so as to project the light from sources 101 onto elements 124 at the proper angle. Light guides 32 have a non-reflective coating 130 over part of their surface to absorb light which passes through the elements 124 at a low contrast angle, since such light reduces the effective contrast of the LC element. Alternatively or additionally, refractive elements can be inserted within the optical coupler which selectively increase the light collection efficiency at the high contrast angles and which reduce the light collection efficiency at the low-contrast angles.

Figure 11:
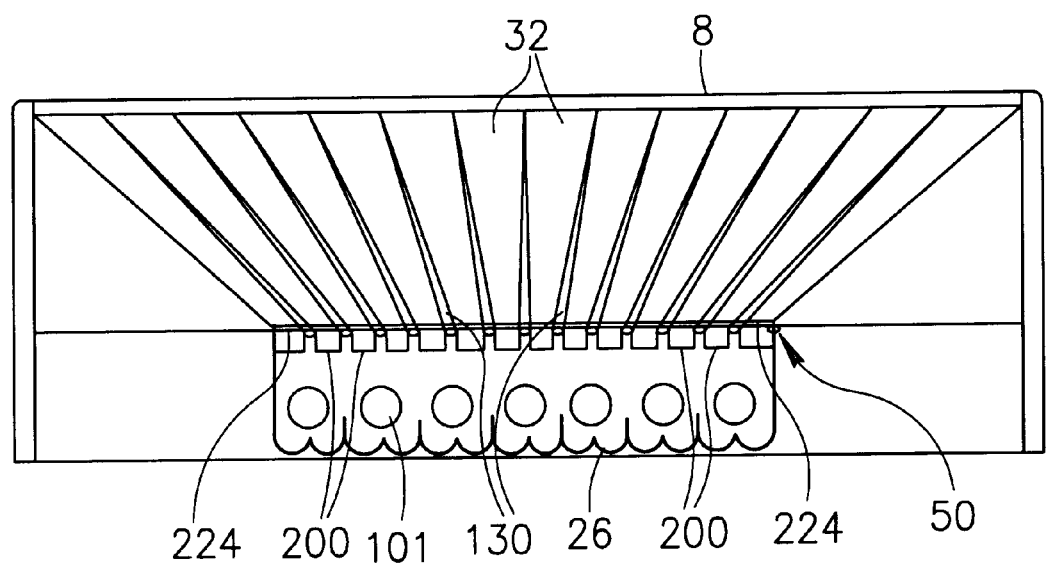
FIG. 11 is a schematic cross-sectional view of a further preferred embodiment of the invention.

In an alternate embodiment of the invention an array of LC elements 224 having a more centered contrast distribution, such as that shown in FIG. 9B, are used. In this case normal illumination is used and the non-reflective coating is adjusted accordingly as shown in FIG. 11.

In a further preferred embodiment of the invention faceplate elements 200 are used to provide light which impinges the LC elements at the correct angle. In a preferred embodiment of the invention, these elements may be fused fiber-optic plates such as the CP series of Fused Fiber-optic Faceplates available from Galileo Electro-optics Corporation of Sturbridge Mass. The faceplate elements can be provided as small blocks each covering only one LC element 24 as shown in FIG. 11 or, alternatively, they can be provided in the form of a larger plate which covers a plurality of LC elements or the entire array 50.

Figure 12A:
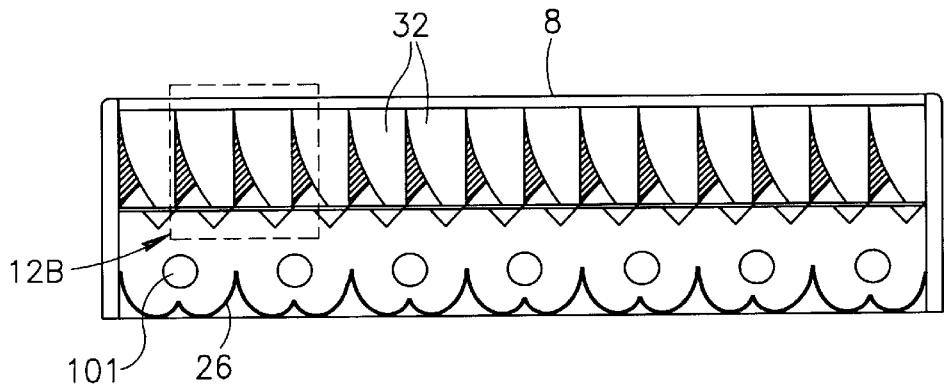
FIGS. 12A, 12B and 13 are schematic cross-sectional views of preferred embodiments of the invention in which light is passed through LC elements a plurality of times.
Figure 12B:
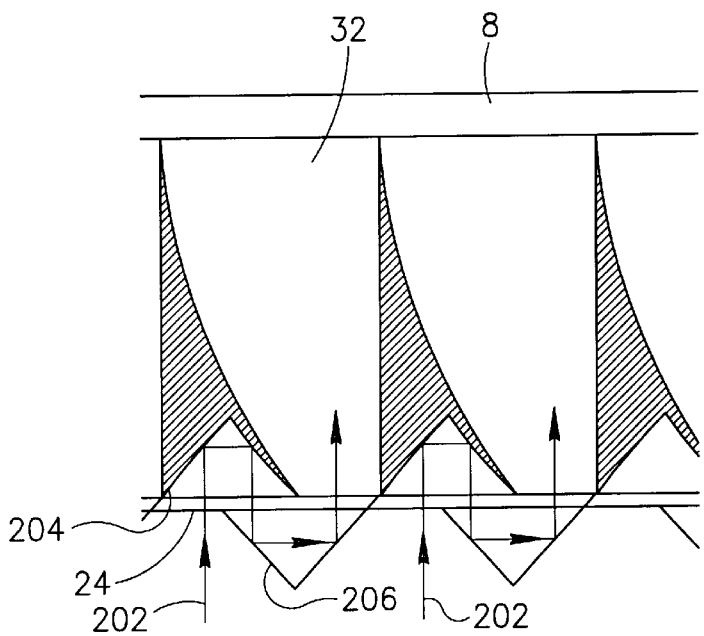
Figure 13:
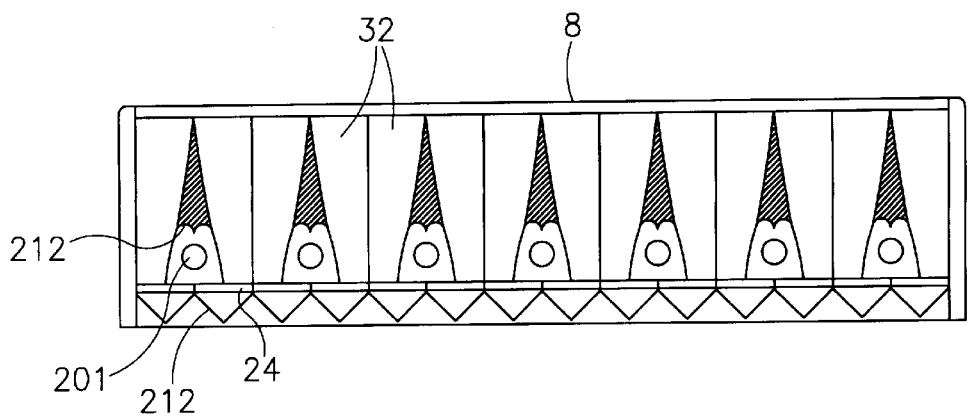

FIGS. 12 and 13 show two methods for increasing the apparent contrast of the LC elements by passing the light through the elements a plurality of times.

In the embodiment of FIG. 12A (and in detail in FIG. 12B) light (as indicated by beams 202) from sources 101 first passes through LC elements 24 and impinges on one leg of a retro-reflector 204. The light is then reflected from the other leg of reflector 204 and through LC element 24 to a second retro-reflector 206. The light reflected from the second retro-reflector passes through LC element 24 a third time before entering light guide 32. Preferably the back side of reflectors 204 and 206 are reflection coated to recycle the light which impinge on them.

In the embodiment shown in FIG. 13, a series of individual light sources 201 are situated between light guides 208. Reflectors 212 are provided to direct the light toward LC elements 24. After passing through the LC element, 38 the light impinges retro-reflector 212 and is reflected back through the LC element a second time before entering light guide 32.

In the embodiments of FIG. 12 and FIG. 13, the contrast between the bright and dark portions of the viewing surface is much greater than if the light were to pass through IC elements 24 only once. Thus LC elements having a lower intrinsic contrast can be used in the embodiments of FIGS. 12 and 13 than in the other embodiments.

Figure 14A:
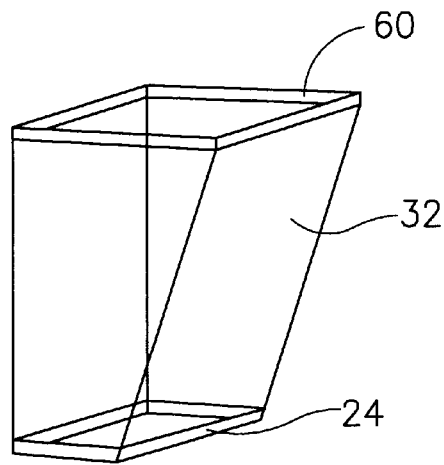
FIGS. 14A–14D show various embodiments of light couplers incorporating diffusers and lenses.

As described in the preceding examples, the LC elements and the light guides are both transparent. Thus, in order to assure flaring of light which enters the LC element normally or homogenization of the light as described above, it is preferred to add additional homogenizing elements to the structure. The basic structure of LC element 24, coupler 32 and a viewing surface portion 60 is shown in FIG. 14A. If light is normally incident on LIC element 24, the light will not be evenly distributed on the portion 60.

Figure 14B:
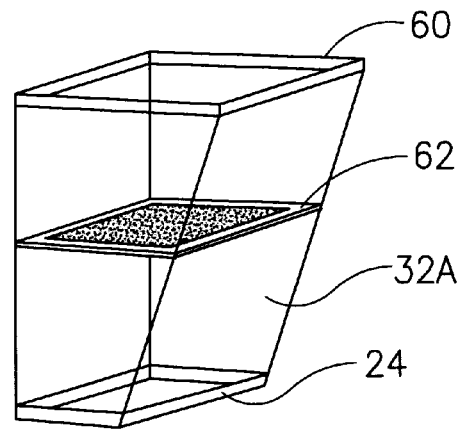

FIG. 14B shows a structure similar to that of FIG. 14A except that a diffusing layer 62 has been added between the LC element and the display portion. This diffuser element may comprise partly reflective elements to reflect a portion of the light at an angle toward the reflecting walls of a coupler 32A. The diffuser may be non-uniform; that is, light is preferably reflected in those regions where it is strong and not in the weakly lit regions. Preferably, the diffuser element should be placed such that the light can reflect within the coupler to completely homogenize and equalize the illumination of the display.

Figure 14C:
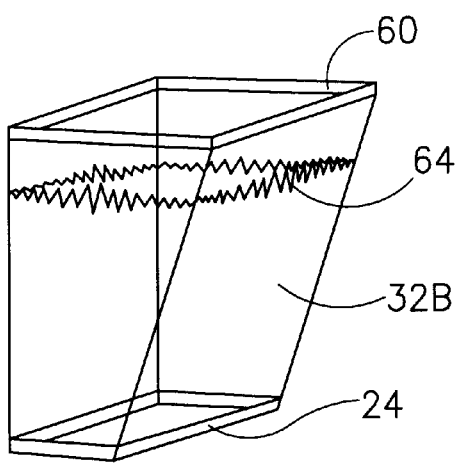
Figure 14D:
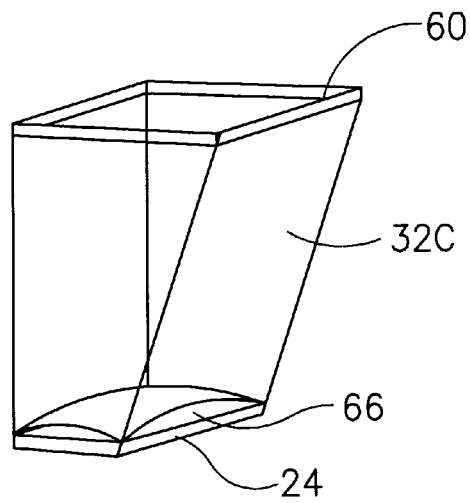

In another embodiment of a diffuser of the invention shown in FIG. 14C, the back of face plate portion 60 is formed with reflecting grooves 64 whose size and shape are adjusted to reflect a portion of incident light in the otherwise brighter portions of the viewing surface toward the walls of the coupler 32B. This reflected light is not lost, but is finally reflected toward the viewing surface to provide uniform illumination. For simplicity only the edges of the grooves are shown in FIG. 14C, it being understood that the grooves extend over the entire cross-section of coupler 32B FIG. 14D shows the use of a lens 66 at the entrance of the coupler. This lens is generally anisotropic and functions to expand and direct the beam so that light is more uniformly distributed over the viewing surface. In one embodiment of the invention, the lens directs a substantial portion of the incoming light to the walls of coupler 32 so as to cause multiple reflections and homogenization of the light. Preferably lens 66 is formed of a material having a refractive index intermediate the index of the LCD and the coupler to reduce loss of light by back reflection.

Other methods of homogenization can be used in conjunction with the various apparatus shown herein. Further the specific methods illustrated in FIGS. 11B–11D are not mutually exclusive and in a practical situation a combination of the methods shown may be used to assure uniform illumination.

Although pyramidal couplers are shown in the above embodiments, the couplers can have any suitable shape and can even be flexible. This would enable a line of LC elements having a particular configuration to be used for illuminating a viewing surface having a different shape.

PCT applications PCT/EP91/00065 filed Dec. 28, 1990 and PCT/EP91/01310 filed Jul. 11, 1991, the disclosures of which are incorporated herein by reference, include a number of additional features which are applicable to the present invention and can be used in conjunction therewith.

While the present invention is described in detail for a simple, manually fed light box, the invention is equally applicable to automatic film changers, alternators and the like.

Although various embodiments, forms and modifications have been shown, described and illustrated above in some detail in accordance with the preferred embodiments of the invention, it will be understood that the descriptions and illustrations are offered merely by way of examples, and that the invention is not limited thereto but encompasses all variations and alternatives falling within the scope of the appended claims and is to be limited in scope only by these appended claims.

What is claimed is:

1. Viewing apparatus comprising:
   a viewing surface having a viewing area comprising elemental portions of a given extent;
   a liquid crystal array comprising an array of controllable liquid crystal light attenuators located behind the viewing surface, each element of the light attenuator array being associated with an elemental portion and including active elements having a controllable opacity;
   a light source, situated behind the array of light attenuators, illuminating the attenuators with light having a range of angles of incidence with the viewing surface; and
   light couplers which couple light which passes through the light attenuators to the viewing surface,
   wherein the attenuators are switchable between a first condition in which the transmission is a maximum and a second condition in which transmission is a minimum, the ratio of the transmission of light passing through the light attenuator for the two conditions constituting an on-off contrast ratio which varies with the angle of incidence of the illumination of the attenuators and
   wherein the light couplers couple light which passes through the attenuators at angles having a high on-off contrast ratio with a higher efficiency as compared to light at other angles to the viewing surface and further including:
   elements situated between the light source and the liquid crystal array which operate on light from said source to provide light of greater intensity at angles at which the on-off contrast ratio is relatively high than at angles at which the on-off contrast ratio is relatively low.

2. Viewing apparatus comprising:
   a viewing surface having a viewing area comprising elemental portions of a given extent;
   a liquid crystal array comprising an array of controllable liquid crystal light attenuators located behind the viewing surface, each element of the light attenuator array being associated with an elemental portion and including active elements having a controllable opacity;
   a light source, situated behind the array of light attenuators, illuminating the attenuators with light having a range of angles of incidence with the viewing surface; and
   light couplers which couple light which passes through the light attenuators to the viewing surface,
   wherein the attenuators are switchable between a first condition in which the transmission is a maximum and a second condition in which transmission is a minimum, the ratio of the transmission of light passing through the light attenuator for the two conditions constituting an on-off contrast ratio which varies with the angle of incidence of the illumination of the attenuators and
   wherein the light couplers couple light which passes through the attenuators at angles having a high on-off contrast ratio with a higher efficiency as compared to light at other angles to the viewing surface and further including:
   faceplate elements which are situated intermediate the light source and the liquid crystal array, said faceplate elements being constructed to channel light from the light source such that light from the source impinges on the liquid crystal attenuators at angles at which the on-off contrast ratio is relatively high.

3. Apparatus according to claim 2 wherein the faceplate elements are fused fiber optic plates.

* * * * *